United States Patent
Kumagai et al.

(10) Patent No.: US 9,733,082 B2
(45) Date of Patent: Aug. 15, 2017

(54) TILT DETECTING SYSTEM AND TILT DETECTING METHOD

(71) Applicant: Kabushiki Kaisha TOPCON, Tokyo-to (JP)

(72) Inventors: Kaoru Kumagai, Tokyo-to (JP); Fumio Ohtomo, Saitama (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 133 days.

(21) Appl. No.: 14/923,940

(22) Filed: Oct. 27, 2015

(65) Prior Publication Data

US 2016/0131479 A1    May 12, 2016

(30) Foreign Application Priority Data

Nov. 12, 2014 (JP) ................................. 2014-229755

(51) Int. Cl.
*G01C 15/06* (2006.01)
*G01C 15/00* (2006.01)

(52) U.S. Cl.
CPC .......... *G01C 15/06* (2013.01); *G01C 15/002* (2013.01)

(58) Field of Classification Search
CPC .............................. G01C 15/06; G01C 15/002
USPC .......... 33/282, 283, 284, 290, 292, 293, 294
See application file for complete search history.

(56) References Cited

U.S. PATENT DOCUMENTS

| | | | |
|---|---|---|---|
| 6,023,326 A * | 2/2000 | Katayama | G01C 15/002 33/290 |
| 6,732,051 B1 | 5/2004 | Kirk et al. | |
| 7,804,996 B2 | 9/2010 | Ohtomo et al. | |
| 7,982,665 B2 | 7/2011 | Kumagai et al. | |
| 8,265,817 B2 | 9/2012 | Tener et al. | |
| 8,736,819 B2 | 5/2014 | Nagai | |
| 9,073,637 B2 | 7/2015 | Ohtomo et al. | |
| 2002/0060788 A1 * | 5/2002 | Ohtomo | G01C 15/002 356/139.1 |

(Continued)

FOREIGN PATENT DOCUMENTS

| | | |
|---|---|---|
| DE | 102010024014 A1 | 12/2011 |
| EP | 1524498 A1 | 4/2005 |

(Continued)

OTHER PUBLICATIONS

European communication dated Apr. 11, 2016 in corresponding European patent application No. 15192741.5.

(Continued)

*Primary Examiner* — G. Bradley Bennett
(74) *Attorney, Agent, or Firm* — Nields, Lemack & Frame, LLC (57) ABSTRACT

The invention provides a tilt detecting system comprising, a surveying instrument having a distance measuring function and a line laser projecting unit installed as horizontally rotatable for projecting a vertical line laser, and a photodetection device having at least two photodetection units provided at a known interval, a target with a retro-reflectivity and an arithmetic unit, wherein the line laser projecting unit is rotated, each of the photodetection units are made to scan the line laser and the arithmetic unit detects a tilting angle of the photodetection device based on a deviation between a photodetection time moment of each photodetection unit and the distance measurement result of the target of the surveying instrument.

15 Claims, 8 Drawing Sheets

(56) References Cited

U.S. PATENT DOCUMENTS

| | | | |
|---|---|---|---|
| 2002/0185618 A1 | 12/2002 | Ohishi et al. | |
| 2004/0200947 A1* | 10/2004 | Lau | G01B 11/002 250/202 |
| 2004/0246461 A1 | 12/2004 | Ohtomo et al. | |
| 2005/0274879 A1* | 12/2005 | Osaragi | E02F 3/847 250/231.13 |
| 2005/0286760 A1 | 12/2005 | Ohtomo et al. | |
| 2006/0271263 A1 | 11/2006 | Self et al. | |
| 2009/0235541 A1* | 9/2009 | Kumagai | G01C 15/004 33/281 |
| 2010/0033371 A1 | 2/2010 | Kumagai et al. | |
| 2012/0057021 A1* | 3/2012 | Kumagai | G01C 3/08 348/135 |
| 2012/0114229 A1 | 5/2012 | Zhou | |
| 2012/0124850 A1 | 5/2012 | Ortleb et al. | |
| 2012/0190386 A1 | 7/2012 | Anderson | |
| 2012/0320195 A1 | 12/2012 | Tener et al. | |
| 2012/0320203 A1 | 12/2012 | Liu | |
| 2014/0210663 A1 | 7/2014 | Metzler | |
| 2014/0240498 A1 | 8/2014 | Ohtomo et al. | |
| 2015/0219455 A1* | 8/2015 | Jordil | G01C 9/00 33/228 |
| 2015/0316374 A1* | 11/2015 | Winter | G01C 15/006 33/293 |
| 2016/0238385 A1* | 8/2016 | Ohtomo | G01C 1/04 |

FOREIGN PATENT DOCUMENTS

| | | |
|---|---|---|
| EP | 1906144 A2 | 4/2008 |
| EP | 2511781 A1 | 10/2012 |
| JP | 5-118850 A | 5/1993 |
| JP | 8-285588 A | 11/1996 |
| JP | 2002-6424 A | 1/2002 |
| JP | 2006-10376 A | 1/2006 |
| JP | 2010-38822 A | 2/2010 |
| JP | 2015-1450 A | 1/2015 |
| WO | 2008/124713 A2 | 10/2008 |
| WO | 2012/049438 A1 | 4/2012 |

OTHER PUBLICATIONS

European communication mailed Feb. 6, 2015 in co-pending European patent application No. 14171346.1.

IEEE, Proceedings of SICE Annual Conference 2010, Aug. 18-21, 2010, "Control System Design for Visual Based Indoor Inspection Helicopter", pp. 811-816, Higuchi, et al.

* cited by examiner

TILT DETECTING SYSTEM AND TILT DETECTING METHOD

BACKGROUND OF THE INVENTION

The present invention relates to a tilt detecting system and a tilt detecting method, by which a tilt of a photodetection device can be detected.

As a method for distance measurement to a measuring point, there is a method for measuring a distance to a measuring point, in which a target having retro-reflectivity is installed on a measuring point and a target is measured by a surveying instrument such as a total station.

Normally, a target is provided at an upper end of a pole and a lower end of the pole is installed at a measuring point. In order to accurately measure a distance to the measuring point, it is necessary for the target to be positioned just above the measuring point. In case the pole is tilted, it is necessary to detect a tilting angle of the pole and to correct the position of the target.

Conventionally, a laser plane is generated by rotary irradiation of a laser beam from a surveying instrument main unit along a reference line of a surveying instrument or a laser plane is generated by projecting a line laser expanding in a horizontal direction, and the laser beam is received by two detectors, which are separated from each other by a predetermined interval. Each detector has a length as required in a vertical direction. A deviation length between photodetecting positions of the two detectors with the laser plane as reference is measured and a tilting angle of the target with respect to the reference line of the surveying instrument is obtained from the interval and the deviation length of the two detectors.

In a case of the conventional method, it is so arranged that an accuracy of the tilting angle as detected is determined according to a resolving power of the measurement of the interval and the deviation length between two detectors, and the interval between the two detectors must be increased in order to improve the detection accuracy. On the other hand, a measurement range of the tilting angle is determined according to the interval between the two detectors and the size (i.e. size of a photodetecting range) of the two detectors. In order to keep the measurement range as desired, there has been a problem in that the size of the detectors must be increased in proportion to the interval between the two detectors.

Further, conventionally, detecting of a tilting angle with respect to horizontal and vertical lines are possible, but cannot be attained with a high accuracy and a high responding speed, and there has been no tilt detecting device, by which a tilt of a target separated from the reference line of a surveying instrument main unit can be measured at higher speed and at higher accuracy and which can be miniaturized.

SUMMARY OF THE INVENTION

It is an object of the present invention to provide a tilt detecting system and tilt detecting method, by which it is possible to detect a tilting angle of a target in an easier manner and with higher accuracy.

To attain the object as described above, a tilt detecting system according to the present invention comprises, a surveying instrument having a distance measuring function and a line laser projecting unit installed as horizontally rotatable for projecting a vertical line laser, and a photodetection device having at least two photodetection units provided at a known interval, a target with a retro-reflectivity and an arithmetic unit, wherein the line laser projecting unit is rotated, each of the photodetection units are made to scan the line laser and the arithmetic unit detects a tilting angle of the photodetection device based on a deviation between a photodetection time moment of each photodetection unit and the distance measurement result of the target of the surveying instrument.

Further, in the tilt detecting system according to the present invention, the line laser projecting unit is moved reciprocally and the line laser is received at least twice by each photodetection unit.

Further, the tilt detecting system according to the present invention further comprises a diffraction grating provided on the line laser projecting unit, wherein the line laser is divided at a predetermined angular interval.

Further, in the tilt detecting system according to the present invention, the photodetection unit is a polyhedron sensor having photodetection sensors installed at a predetermined angular pitch in a circumferential direction and the target is an omnidirectional prism.

Further, in the tilt detecting system according to the present invention, the surveying instrument further has a tracking function, the surveying instrument projects a tracking light and tracks the photodetection device based on the tracking light reflected by the target.

Further, in the tilt detecting system according to the present invention, the photodetection device further comprises a pole for supporting the photodetection device and a two-dimensional directional sensor for receiving the tracking light of the surveying instrument and detects an inclining angle in an approaching and separating direction with respect to the surveying instrument and a rotation angle around a centerline of the pole as a center.

Further, in the tilt detecting system according to the present invention, the photodetection device is provided on a flying object, the surveying instrument has a tracking function, the surveying instrument measures a position of the flying object, and corrects the position of the flying object based on a tilting angle of the photodetection device.

Further, in the tilt detecting system according to the present invention, the photodetection device has at least three photodetection units and wherein the line laser projecting unit is rotated at a known speed and the line laser is scanned by each photodetection unit, and the arithmetic unit detects a tilting angle of the photodetection device based on a deviation of photodetection time between another photodetection unit and one of the photodetection units as reference and a deviation of photodetection time between the other photodetection unit and the one as reference.

Further, a tilt detecting method according to the present invention comprises, a step of projecting a vertical line laser from a line laser projecting unit installed on a surveying instrument, a step of horizontally rotating the line laser projecting unit around an optical axis of a tracking light as a center and scanning the line laser so as to pass at least two photodetection units installed at a known interval on a photodetection device, a step of measuring a distance to a target of the photodetection device by the surveying instrument, and a step of detecting a tilting angle of the photodetection device based on a deviation of photodetection time when each photodetection unit of the photodetection device is made to receive the line laser.

Furthermore, the tilt detecting method according to the present invention comprises, a step of scanning the line laser so as to pass at least three photodetection units installed at a known interval on the photodetection device at a constant speed, and a step of detecting a tilting angle of the photodetection device based on a deviation of photodetection time between another photodetection unit and one of the photodetection units as reference and a deviation of photodetection time between the other photodetection unit and the one as reference when each photodetection unit is made to receive the line laser.

According to the present invention, the tilt detecting system comprises, a surveying instrument having a distance measuring function and a line laser projecting unit installed as horizontally rotatable for projecting a vertical line laser, and a photodetection device having at least two photodetection units provided at a known interval, a target with a retro-reflectivity and an arithmetic unit, wherein the line laser projecting unit is rotated, each of the photodetection units are made to scan the line laser and the arithmetic unit detects a tilting angle of the photodetection device based on a deviation between a photodetection time moment of each photodetection unit and the distance measurement result of the target of the surveying instrument. As a result, it is possible to detect the tilting angle regardless of the distance between each photodetection unit, the photodetection unit can be designed in smaller size, and the tilting angle of the photodetection device can be detected in an easier manner, a shorter time and with high accuracy.

Further, according to the present invention, in the tilt detecting system, the line laser projecting unit is moved reciprocally and the line laser is received at least twice by each photodetection unit. As a result, it is possible to increase a detection sensitivity of each photodetection unit by two times or more, the difference of response time based on an individual difference of each photodetection unit can be cancelled and the tilting angle of the photodetection device can be detected with higher accuracy.

Further, according to the present invention, the tilt detecting system further comprises a diffraction grating provided on the line laser projecting unit, wherein the line laser is divided at a predetermined angular interval. As a result, it is possible to make each of the photodetection units to receive the line laser a plurality of times by a single scanning operation and a detection accuracy of the tilting angle can be further improved by averaging processing of the tilting angle as detected.

Further, according to the present invention, in the tilt detecting system, the photodetection unit is a polyhedron sensor having photodetection sensors installed at a predetermined angular pitch in a circumferential direction and the target is an omnidirectional prism. As a result, it is possible to track the photodetection device from any direction, the line laser can be received by each of the photodetection units, there is no need to direct each of the photodetection units toward a tilt detecting device, and this contributes to an improvement of a working efficiency.

Further, according to the present invention, in the tilt detecting system, the surveying instrument further has a tracking function, the surveying instrument projects a tracking light and tracks the photodetection device based on the tracking light reflected by the target. As a result, there is no need to manually direct the surveying instrument towards the photodetection device, and this contributes to the improvement of the working efficiency.

Further, according to the present invention, in the tilt detecting system, the photodetection device further comprises a pole for supporting the photodetection device and a two-dimensional directional sensor for receiving the tracking light of the surveying instrument and detects an inclining angle in an approaching and separating direction with respect to the surveying instrument and a rotation angle around a centerline of the pole as a center. As a result, it is possible to correct a three-dimensional position of the photodetection device with high accuracy.

Further, according to the present invention, in the tilt detecting system, the photodetection device is provided on a flying object, the surveying instrument has a tracking function, the surveying instrument measures a position of the flying object, and corrects the position of the flying object based on a tilting angle of the photodetection device. As a result, an accuracy of photogrammetry by the flying object can be improved.

Further, according to the present invention, in the tilt detecting system, the photodetection device has at least three photodetection units and wherein the line laser projecting unit is rotated at a known speed and the line laser is scanned by each photodetection unit, and the arithmetic unit detects a tilting angle of the photodetection device based on a deviation of photodetection time between another photodetection unit and one of the photodetection units as reference and a deviation of photodetection time between the other photodetection unit and the one as reference. As a result, there is no need for the surveying instrument to have a distance measuring mechanism, and this contributes to a simplification of a structure of the instrument and the manufacturing cost can be reduced.

Further, according to the present invention, the tilt detecting method comprises, a step of projecting a vertical line laser from a line laser projecting unit installed on a surveying instrument, a step of horizontally rotating the line laser projecting unit around an optical axis of a tracking light as a center and scanning the line laser so as to pass at least two photodetection units installed at a known interval on a photodetection device, a step of measuring a distance to a target of the photodetection device by the surveying instrument, and a step of detecting a tilting angle of the photodetection device based on a deviation of photodetection time when each photodetection unit of the photodetection device is made to receive the line laser. As a result, it is possible to detect the tilting angle regardless of the distance between each photodetection unit, the photodetection unit can be designed in smaller size, and the tilting angle of the photodetection device can be detected in an easier manner, a shorter time and with higher accuracy.

Furthermore, according to the present invention, the tilt detecting method comprises, a step of scanning the line laser so as to pass at least three photodetection units installed at a known interval on the photodetection device at a constant speed, and a step of detecting a tilting angle of the photodetection device based on a deviation of photodetection time between another photodetection unit and one of the photodetection units as reference and a deviation of photodetection time between the other photodetection unit and the one as reference when each photodetection unit is made to receive the line laser. As a result, there is no need for the surveying instrument to have a distance measuring mechanism, and this contributes to a simplification of the structure of the instrument and the manufacturing cost can be reduced.

DETAILED DESCRIPTION OF THE PREFERRED EMBODIMENTS

A description will be given below on embodiments of the present invention by referring to the attached drawings.

First, referring to FIG. 1, a description will be given on a distance measuring system according to a first embodiment of the present invention.

Figure 1:
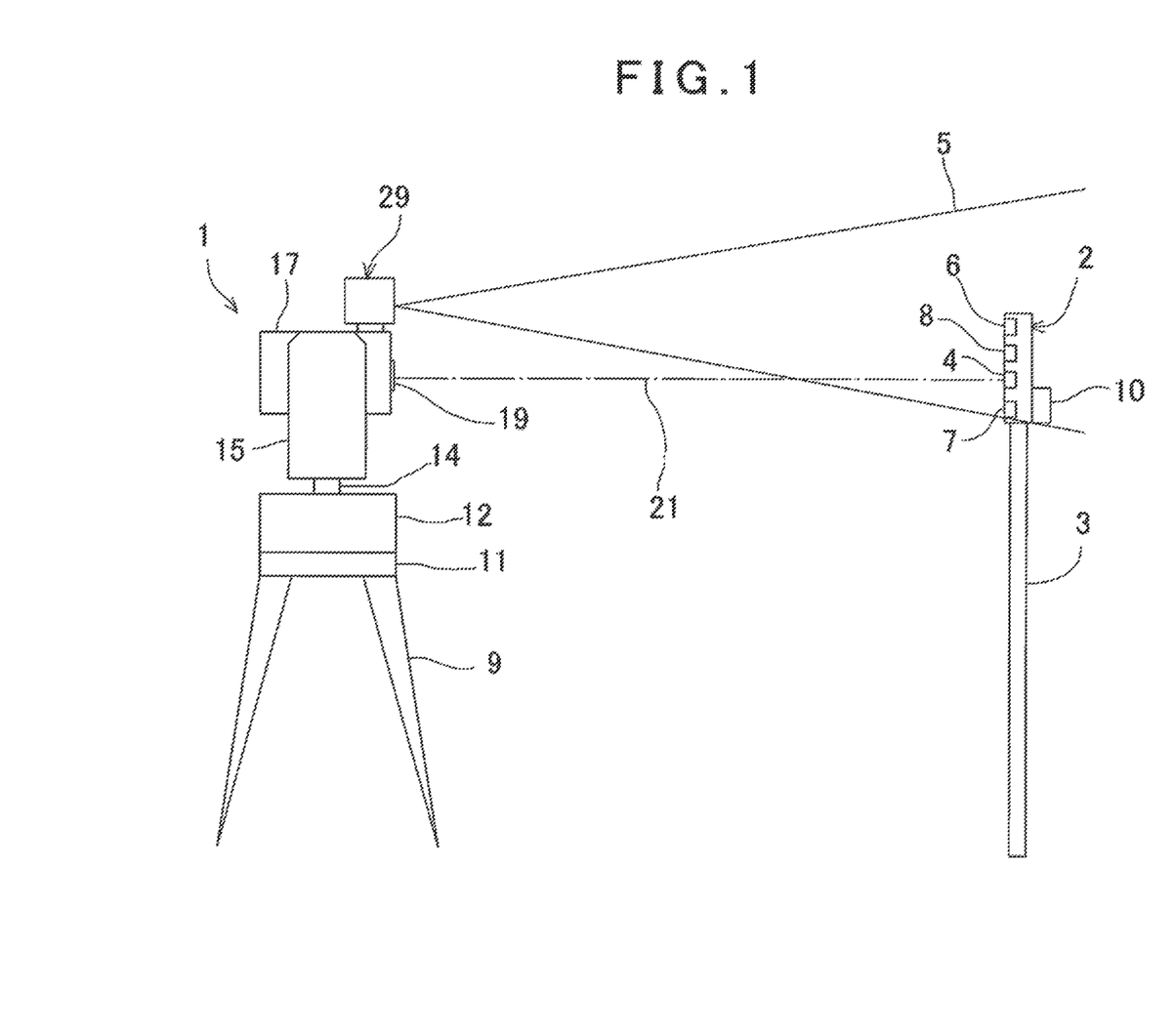
FIG. 1 is a side view to show a tilt detecting system according to a first embodiment of the present invention.

In FIG. 1, reference numeral 1 denotes a surveying instrument having a tilt detecting mechanism, a total station, for instance.

Within a measurement range of the surveying instrument 1, a photodetection device 2 in cylindrical shape is erected. The photodetection device 2 is installed at an upper end of a supporting member as required (shows a pole 3 in the figure) such as a pole, a tripod, etc. The photodetection device 2 has a target 4 having retro-reflectivity such as a corner cube, a reflection sheet, etc. A height of the target 4, i.e. the height from a lower end of the pole 3, is already known.

Further, on the photodetection device 2, a first photodetection sensor 6 as a first photodetection unit and a second photodetection sensor 7 as a second photodetection unit which are able to receive a line laser 5 (to be described later) spreading in a vertical direction, are installed at a predetermined interval in an up-and-down direction. The interval between the first photodetection sensor 6 and the second photodetection sensor 7 is already known.

Further, on the photodetection device 2, a two-dimensional directional sensor 8 is provided. The directional sensor 8 is, for instance, a profile sensor which is an aggregate of pixels as shown in FIG. 10A, pixels are arranged in a matrix state, and it is so arranged that each of the pixels receives a tracking light (to be described later) respectively.

Figure 10A:
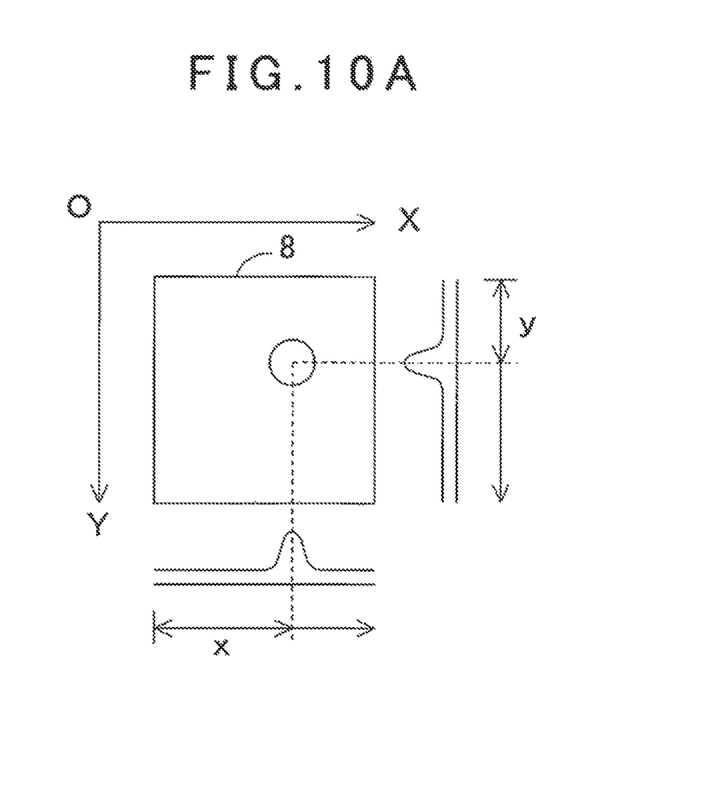
FIG. 10A is an explanatory drawing to show one example of a directional sensor.
Figure 10B:
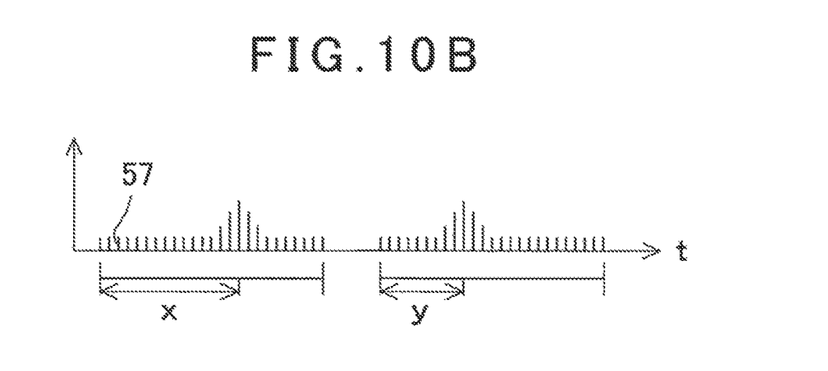
FIG. 10B is an explanatory drawing to show a detecting method of a directional angle using the directional sensor.

The profile sensor has a rectangular shape, as shown in FIG. 10A, for instance. As shown in FIG. 10B, the profile sensor has an origin point at an upper left corner and by detecting a position of a pixel with a peak level of a photodetection signal 57 of the tracking light when scanning is performed per each column in an X direction and in a Y direction, a tracking light photodetecting position (position of an object to be measured) within the profile sensor can be detected.

Therefore, by the profile sensor, based on a photodetecting position of the tracking light in the Y direction, an inclining angle (a tilting angle in an approaching and separating direction with respect to the surveying instrument) on a plane in parallel to a spreading direction of the line laser 5 of the photodetection device 2 can be detected. Further, a rotation angle with an axis of the pole 3 as the center with respect to the line laser 5 can be detected by the profile sensor based on a photodetecting position of the tracking light in the X direction. It is to be noted that a CCD or a CMOS sensor may be used as the directional sensor 8.

Further, an arithmetic unit 10 is provided on the photodetection device 2. The arithmetic unit 10 calculates a tilting angle of the photodetection device 2 based on the line laser 5 received by the first photodetection sensor 6 and the second photodetection sensor 7. Based on the photodetection signal as inputted to the directional sensor 8, the arithmetic unit 10 calculates an inclining angle toward the surveying instrument 1 and a tilting angle in a rotating direction of the pole 3, and it is so arranged that calculation results are transmitted to the surveying instrument 1.

Figure 2:
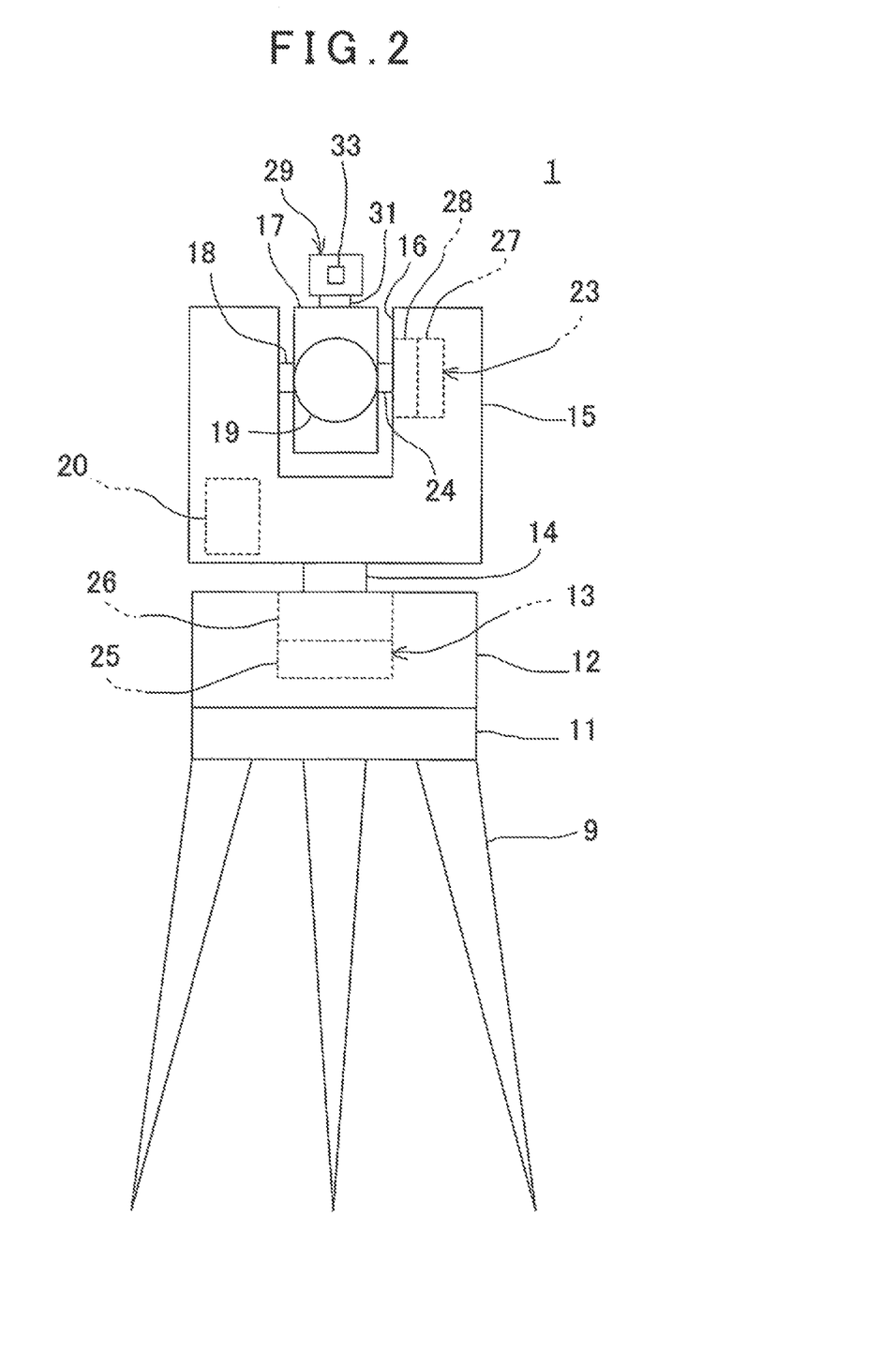
FIG. 2 is a front view to show one example of a tilt detecting device to be used in the tilt detecting system.

Next, by referring to FIG. 2, description will be given on one example of the surveying instrument 1 to be used in the present embodiment.

A leveling unit 11 is mounted on a tripod 9, and a base unit 12 is provided on the leveling unit 11. A horizontal rotation driving unit 13 is accommodated in the base unit 12. The horizontal rotation driving unit 13 has a hollow horizontal output shaft 14 extending vertically, and a frame unit 15, which is a rotation unit, is mounted on an upper end of the horizontal output shaft 14.

The frame unit 15 has a recessed portion 16 and a telescope unit 17, which is a rotation unit, is accommodated in the recessed portion 16. The telescope unit 17 is rotatably supported by the frame unit 15 via a vertical rotation shaft 18. On the telescope unit 17, a sighting telescope 19 having a distance measuring optical axis 21 (see FIG. 1) is provided, and a distance measuring unit (not shown) for emitting a distance measuring light of an invisible light, is accommodated. Further, in the telescope unit 17, a tracking unit (not shown), which emits a tracking light of an invisible light on a tracking optical axis of the same axis as the distance measuring optical axis 21, is accommodated.

A vertical rotation driving unit 23 is accommodated in the frame unit 15 and the vertical rotation driving unit 23 is connected to the vertical rotation shaft 18. The vertical rotation driving unit 23 has a vertical output shaft 24, and the vertical output shaft 24 is connected with the vertical rotation shaft 18. By driving of the vertical rotation driving unit 23, the telescope unit 17 is rotated in an elevation direction via the vertical output shaft 24 and the vertical rotation shaft 18.

The horizontal rotation driving unit 13 has a rotation motor 25 and a clutch unit 26. When the clutch unit 26 is in a connected state, a rotational force of the rotation motor 25 is transmitted to the horizontal output shaft 14. When the clutch unit 26 is in a disconnected state, the horizontal output shaft 14 is disconnected from the rotation motor 25, and the horizontal output shaft 14 alone can be rotated. Further, when the clutch unit 26 is in a disconnected state, the horizontal output shaft 14 and the rotation motor 25 are connected via a predetermined friction force.

Therefore, when the clutch unit 26 is in the disconnected state, the frame unit 15 can be relatively rotated with respect to the horizontal rotation driving unit 13, and a position of the frame unit 15 is maintained by the friction force.

The vertical rotation driving unit 23 also has the same structure as that of the horizontal rotation driving unit 13.

The vertical rotation driving unit 23 has a rotation motor 27 and a clutch unit 28. When the clutch unit 28 is in the connected state, a rotational force of the rotation motor 27 is transmitted to the vertical output shaft 24. When the clutch unit 28 is in the disconnected state, the vertical output shaft 24 is disconnected from the rotation motor 27, and the vertical output shaft 24 alone can be rotated. Further, when the clutch unit 28 is in the disconnected state, the vertical output shaft 24 and the rotation motor 27 are connected via the predetermined friction force, and the telescope unit 17 is maintained at an arbitrary position even if the clutch unit 28 is in the disconnected state.

Although not shown in the figure, a horizontal angle encoder is provided on the horizontal output shaft 14, and a rotation angle of the horizontal output shaft 14 is detected. A vertical angle encoder is provided on the vertical output shaft 24 and rotation angle of the vertical output shaft 24 is detected.

On an upper surface of the telescope unit 17, a line laser projecting unit 29 for emitting a laser beam (a line laser 5) spreading in an up-and-down direction is provided. The line laser projecting unit 29 is supported on the telescope unit 17 via a vertical rotation shaft 31 and can be rotated in a horizontal direction around the vertical rotation shaft 31 as the center. Further, the line laser projecting unit 29 has a horizontal driving unit (not shown) and can be rotated in a horizontal direction independently from the telescope unit 17.

The line laser projecting unit 29 projects a visible laser beam such as an infrared light and has a cylindrical lens 33 mounted at an emission outlet of the laser beam. The cylindrical lens 33 has a horizontal centerline. The laser beam projected from the line laser projecting unit 29 is diffused so as to have a predetermined spreading angle in an up-and-down direction by the cylindrical lens 33, and the line laser 5 running in a vertical direction is formed. A vertical laser plane is formed by the line laser 5. The spreading angle of the laser plane is 20°, for instance.

A control unit 20 is provided inside the frame unit 15, and the control unit 20 executes a distance measurement and an angle measurement on the target 4 and controls each driving units such as the horizontal rotation driving unit 13 and the vertical rotation driving unit 23. The control unit 20 can receive a result of tilt detection from the photodetection device 2 and is arranged so as to correct a result of distance measurement based on the tilting angle and the inclining angle from the photodetection device 2.

When the pole 3 is installed at a measuring point, a tracking light is emitted from the telescope unit 17. By receiving the tracking light by cooperative movement of a horizontal rotation of the frame unit 15 and a vertical rotation of the telescope unit 17, the sighting telescope 19 tracks the target 4 and a distance measuring optical axis is directed toward the target 4. Under a condition where the pole 3 is installed at the measuring point, the distance measuring unit emits a distance measuring light via the telescope unit 17 and a reflection light from the target 4 is received and the distance is measured. Further, the horizontal angle and the vertical angle are measured based on the results of detection by the horizontal angle encoder and the vertical angle encoder.

At this moment, in a case where the photodetection device 2 is tilted, the target 4 is not positioned on the measuring point and errors are included in the results of distance measurement and angle measurement at the measuring point. For this reason, it is necessary to detect the tilting angle and the like of the photodetection device 2 and to correct a three-dimensional position of the target 4.

Figure 3A:
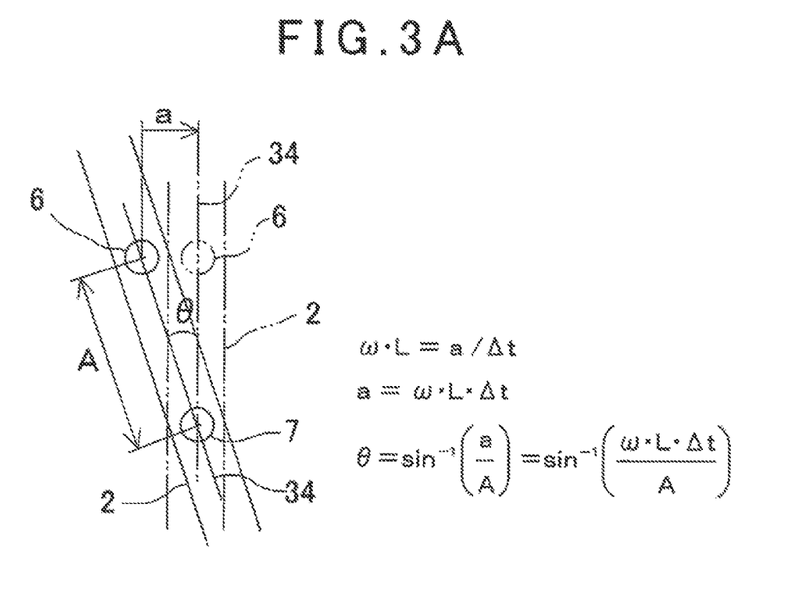
FIG. 3A is a drawing to show a positional relation between a first photodetection sensor and a second photodetection sensor.
Figure 3B:
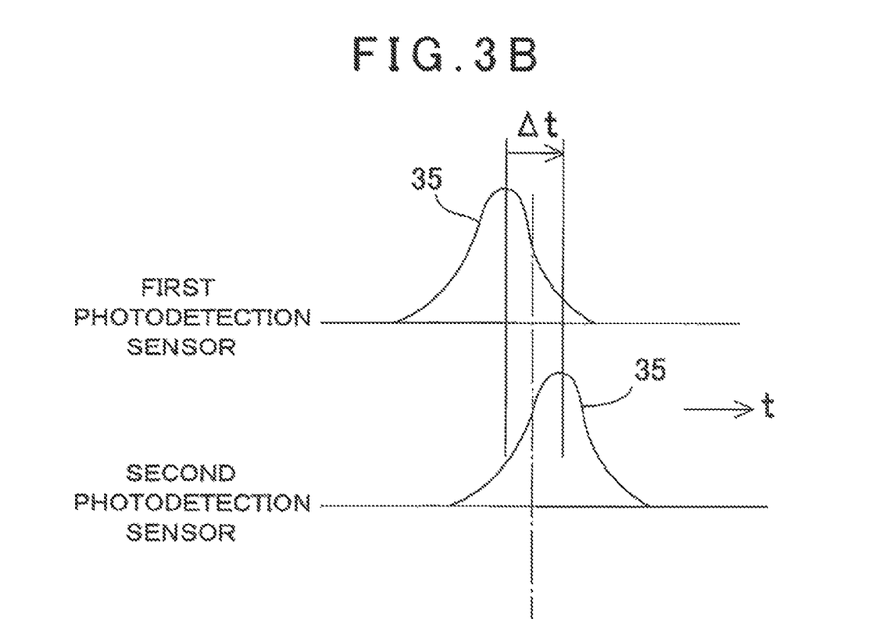
FIG. 3B is a drawing to show photodetecting conditions of the first photodetection sensor and the second photodetection sensor.

In the following, a description will be given on a detection of a tilting angle θ of the photodetection device 2 by referring to FIG. 3A and FIG. 3B according to the present invention. FIG. 3A is an explanatory drawing to show a positional relation of the first photodetection sensor 6 and the second photodetection sensor 7, and in FIG. 3A, reference numeral 34 denotes a centerline of the photodetection device, and the first photodetection sensor 6 and the second photodetection sensor 7 are separated from each other by an amount A in a vertical direction. Further, FIG. 3B is a drawing to show a condition where the first photodetection sensor 6 and the second photodetection sensor 7 receive the line laser 5. The tilting angle θ shows a relative tilting angle with respect to a reference line of the surveying instrument. In the description as given below, a description will be given by supposing that the line laser 5 runs in vertical direction.

When the tilting angle θ of the photodetection device 2 is to be detected, the line laser 5 is projected from the line laser projecting unit 29, and the line laser projecting unit 29 is reciprocally rotated at a predetermined angle (i.e. scanned reciprocally at a predetermined angle) at constant speed and at a known angular speed so that the line laser 5 is received by the first photodetection sensor 6 and the second photodetection sensor 7.

In a case where the photodetection device 2 is tilted, deviation occurs between a timing when the first photodetection sensor 6 receives the line laser 5 and a timing when the second photodetection sensor 7 receives the line laser 5.

As shown in FIG. 3A, at this moment, if a deviation length between the first photodetection sensor 6 and the second photodetection sensor 7 is supposed as "a" and a distance between the first photodetection sensor 6 and the second photodetection sensor 7 is supposed as "A", the tilting angle θ can be expressed by an equation as given below.

$$\theta=\sin^{-1}(a/A)$$

Here, when a scanning angle speed ω [rad/s] is multiplied by a measuring distance L [mm], scanning speed S [mm/s] can be obtained. When scanning speed S [mm/s] is multiplied by a deviation time Δt [s] which, as shown in FIG. 3B, is a photodetection time difference of a photodetection signal 35 between the first photodetection sensor 6 and the second photodetection sensor 7, the deviation length "a" can be obtained. That is, the deviation length "a" and the tilting angle θ can be expressed by equations given as below. Here, the scanning angle speed ω, the measuring distance L and the deviation time Δt are already known.

$$a=\Delta t\omega L \text{ [mm]}$$

$$\theta=\sin^{-1}(a/A)=\sin^{-1}(\Delta t\omega L/A)$$

An inclining angle (i.e. a tilting angle in approaching and separating directions) on a plane, which runs in parallel to a laser plane by the line laser 5, can be detected based on a displacement in an up-and-down direction of a target image with respect to the reference line of a light receiving surface of the directional sensor 8.

After the detections of the tilting angle θ and the inclining angle, the three-dimensional position of the target 4 can be corrected based on the tilting angle θ and the inclining angle as detected, and an accurate distance measurement to the measuring point can be performed.

As described above, in the first embodiment, the vertical laser plane formed by the line laser 5 is scanned and the first photodetection sensor 6 and the second photodetection sensor 7 is made to receive the line laser 5. In a case where the photodetection device 2 is tilted, the tilting angle θ of the photodetection device 2 can be detected based on the time difference to receive the line laser 5 between the first photodetection sensor 6 and the second photodetection sensor 7, and the deviation length at that moment.

Therefore, by detecting the time when the line laser 5 go across between the first photodetection sensor 6 and the second photodetection sensor 7, the tilting angle θ can be detected. Thus, there is no need to increase the distance between the first photodetection sensor 6 and the second photodetection sensor 7, there is no need to design the first photodetection sensor 6 and the second photodetection sensor 7 in larger size, and it is possible to design the photodetection device 2 in a smaller size.

Further, since it would suffice if the line laser 5 is to be received by the first photodetection sensor 6 and the second photodetection sensor 7, a rotation distance for scanning the line laser 5 may be slight, it is possible to detect the tilting angle of the photodetection device 2 in an easier manner, a shorter time and with high accuracy.

Next, by referring to FIG. 1 and FIG. 4, description will be given on a second embodiment of the present invention.

In the second embodiment, under a condition where a telescope unit 17 tracks a target 4, a line laser projecting unit 29 is reciprocated around a tracking optical axis as a center at a low speed and at a constant speed within the range of a predetermined angle, e.g. 1° to 2° for instance, so that a line laser 5 can be received a plurality of times by a first photodetection sensor 6 and a second photodetection sensor 7.

Figure 4:
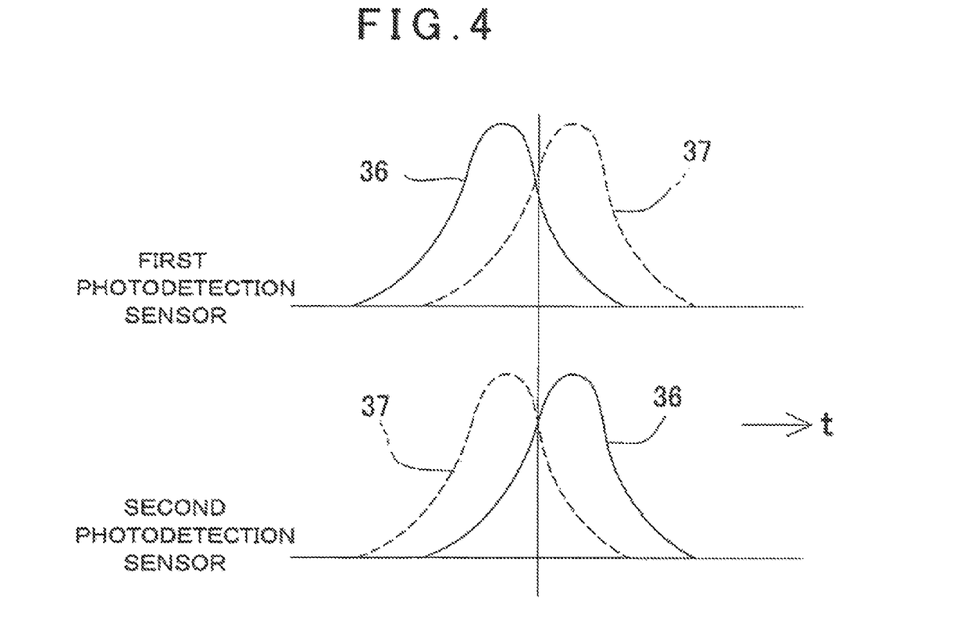
FIG. 4 is a drawing to show photodetection signal waveforms of an outward course and a return course in a second embodiment of the present invention.

It is to be noted that FIG. 4 shows a condition that the line laser 5 is received two times (i.e. in one round trip) by the first photodetection sensor 6 and the second photodetection sensor 7. Further, in FIG. 4, reference numeral 36 denotes a photodetection signal waveform of a first course (i.e. outward course) and reference numeral 37 denotes the photodetection signal waveform of a second course (i.e. return course).

A detection accuracy of a tilting angle θ is determined by a resolving power of measuring a deviation length between the first photodetection sensor 6 and the second photodetection sensor 7, but there is individual difference in responding speed (responding time) for each photodetection sensor. For this reason, a response delay occurs between the sensors due to the individual differences, and there has been a possibility that the resolving power may be decreased due to the delay in response.

Here, if it is supposed that the response time of the first photodetection sensor 6 is τ1 and the response time of the second photodetection sensor 7 is τ2, the response delay Δτ of the second photodetection sensor 7 to the first photodetection sensor 6 can be expressed by an equation as given below.

$$\Delta\tau = \tau_2 - \tau_1$$

Further, a photodetection time difference of a photodetection signal of the second photodetection sensor 7 to the first photodetection sensor 6 at a time of the outward course can be expressed as $-\Delta t + \Delta \tau$. Further, a photodetection time difference of a photodetection signal of the second photodetection sensor 7 to the first photodetection sensor 6 at a time of the return course can be expressed as $-\Delta \tau' + \Delta \tau$.

A total sum of the photodetection time difference between the first photodetection sensor 6 and the second photodetection sensor 7 at the time of the outward course and the photodetection time difference between the first photodetection sensor 6 and the second photodetection sensor 7 at the time of the return course can be expressed as $\Delta t + \Delta t'$. Therefore, in a case where a scanning speed of the line laser 5 is equal to each other between the outward course and the return course (i.e. $\Delta t = \Delta t'$), the total of the photodetection time differences between the first photodetection sensor 6 and the second photodetection sensor 7 at the outward course and at the return course will be $2\Delta t$. Therefore, the response delay of the first photodetection sensor 6 and the response delay of the second photodetection sensor 7 can be cancelled out.

It is desirable that a number of times of the line laser 5 is received by the first photodetection sensor 6 and the second photodetection sensor 7 will be an even number so that the difference of the response times can be cancelled between the first photodetection sensor 6 and the second photodetection sensor 7.

As described above, in the second embodiment of the present invention, it is so arranged that the line laser 5 is reciprocated and received twice by the first photodetection sensor 6 and the second photodetection sensor 7. Thereby, a detection sensitivity of the first photodetection sensor 6 and the second photodetection sensor 7 will be increased by two times. Further, it is possible to cancel the difference of the response time between the first photodetection sensor 6 and the second photodetection sensor 7.

Therefore, an error caused by the difference of response time between the first photodetection sensor 6 and the second photodetection sensor 7 can be prevented, and it is possible to increase the detection accuracy of the tilting angle θ.

It is to be noted that in the second embodiment, the line laser 5 is received one round trip, i.e. received twice by the first photodetection sensor 6 and the second photodetection sensor 7, while it may be so arranged that the line laser 5 is received by two round trips or more and received by the first photodetection sensor 6 and the second photodetection sensor 7 by four times or more. By increasing the number of times of the receiving of the line laser 5 by the first photodetection sensor 6 and the second photodetection sensor 7 and by performing an averaging processing, the detection accuracy of the tilting angle θ can be even more highly accurate.

Figure 5:
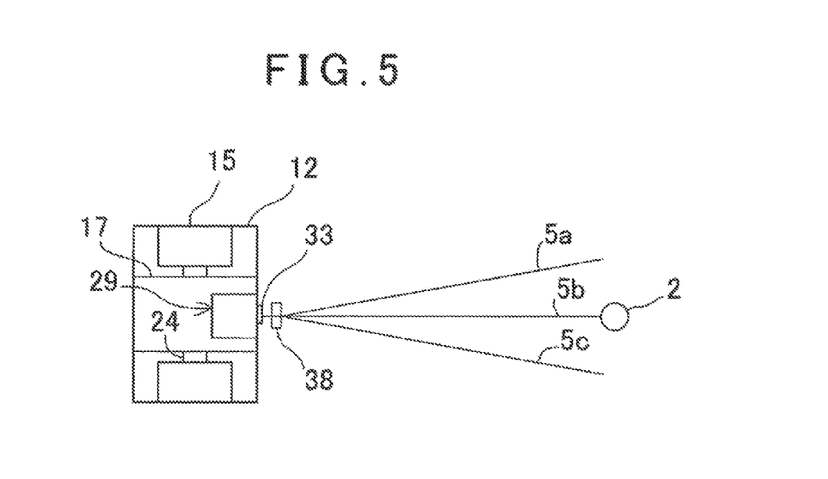
FIG. 5 is a plan view to show a tilt detecting system according to a third embodiment of the present invention.
Figure 6:
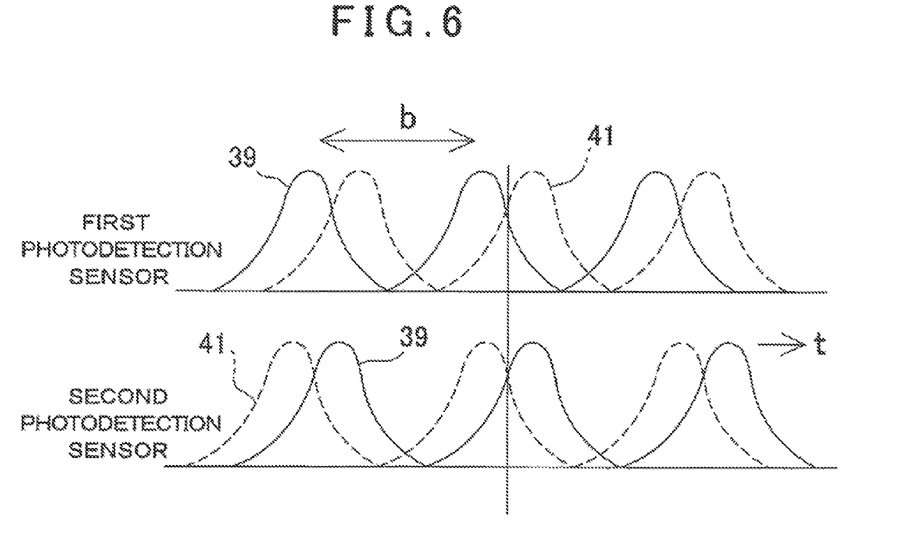
FIG. 6 is a drawing to show photodetection signal waveforms of an outward course and a return course according to the third embodiment of the present invention.

Next, by referring to FIG. 5 and FIG. 6, a description will be given on a third embodiment of the present invention. In FIG. 5, the same component as shown in FIG. 1 and FIG. 2 is referred by the same symbol, and detailed description is omitted.

In the third embodiment, a diffraction grating 38 is provided on an emitting side of a cylindrical lens 33. By the diffraction grating 38, a line laser 5 is divided by a predetermined diffraction pitch (a predetermined angular pitch) "b" to three line lasers 5a to 5c which have an interval of 10°, for instance.

The detection accuracy of the tilting angle depends on a stability of a scanning angle speed, and it is necessary to detect the scanning angle speed of a case where a line laser projecting unit 29 is rotated at a constant speed or the scanning angle speed when a first photodetection sensor 6 (see FIG. 1) and a second photodetection sensor 7 (see FIG. 1) receive the line laser 5.

In the third embodiment, by the diffraction grating 38, pitch between the line lasers 5a to 5c is set as a predetermined diffraction pitch (predetermined angular pitch) "b". Therefore, by regarding that the scanning angle speed between the line laser 5a and the line laser 5b is constant and by detecting the time when the line laser 5a and the line laser 5b pass through the first photodetection sensor 6, the scanning angle speed between the line laser 5a and the line laser 5b can be easily obtained.

Further, even in a case where there is unevenness in the rotation speed of the line laser projecting unit 29, if an angular pitch is small, the scanning speed can be regarded as constant between the line lasers 5a to 5c.

Therefore, the scanning speed of the line lasers 5a to 5c may not be constant, and even in case where it is difficult to rotate the line laser projecting unit 29 at constant speed, it is possible to detect the tilting angle of the photodetection device 2 with high accuracy.

Further, by diffraction grating 38, the line laser 5 can be divided into the line lasers 5a to 5c, and the line laser 5 can be received a plurality of times by the first photodetection sensor 6 and the second photodetection sensor 7 during a single scanning. Therefore, the averaging processing can be carried out by a single scanning, which contributes to the improvement of the detection accuracy of the tilting angle of the photodetection device 2.

Further, a signal waveform 39 as detected by the first photodetection sensor 6 and the second photodetection sensor 7 is a signal waveform with a stable cycle due to the diffraction grating 38. Therefore, a time deviation is obtained by a phase measurement or a correlation processing of the signal waveform 39 of the first photodetection sensor 6 and the second photodetection sensor 7. Or, when the line laser projecting unit 29 is moved on the outward course and on the return course, a time deviation can be obtained by means of phase measurement or correlation processing of the signal waveform 41 in the outward course or in the return course of the signal waveform 39 of either one of the first photodetection sensor 6 and the second photodetection sensor 7 and it is possible to detect the tilting angle with high resolution power.

In the third embodiment, although the line laser 5 is divided to three line lasers 5a to 5c by the diffraction grating 38, the number of divisions may be four or more. By dividing the line laser 5 to four or more, the number of cycle of a signal waveform to be detected by the first photodetection sensor 6 and the second photodetection sensor 7 increase and the resolving power can be increased more.

Figure 7:
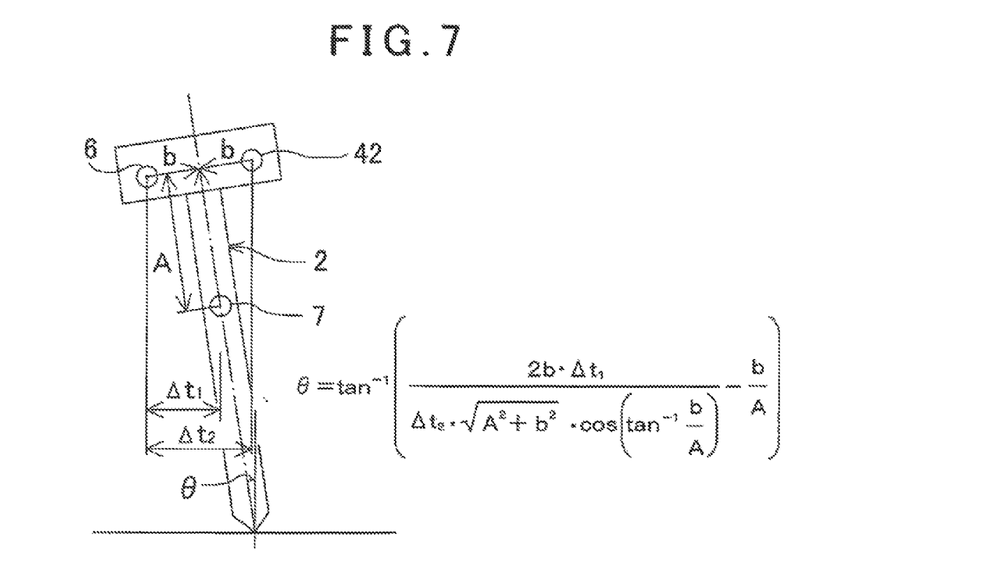
FIG. 7 is a drawing to explain a positional relation of a first photodetection sensor, a second photodetection sensor and a third photodetection sensor according to a fourth embodiment of the present invention.

Next, referring to FIG. 7, description will be given on a fourth embodiment of the present invention. In the fourth embodiment, in addition to the first photodetection sensor 6 and the second photodetection sensor 7, a third photodetection sensor 42, which is a third photodetection unit, is provided on the photodetection device 2 (see FIG. 1).

The first photodetection sensor 6 and the third photodetection sensor 42 are positioned on a plane, which perpendicularly crosses a laser plane of the line laser 5 (see FIG. 1). Further, the second photodetection sensor 7 is positioned on a perpendicular bisector of the first photodetection sensor 6 and the third photodetection sensor 42.

Here, if it is supposed that, a photodetection time difference of the first photodetection sensor 6 and the second photodetection sensor 7 is Δt1 [s], the photodetection time difference of the first photodetection sensor 6 and the third photodetection sensor 42 is Δt2 [s], a distance from the second photodetection sensor 7 to a line, which connects the first photodetection sensor 6 and the third photodetection sensor 42, is "A", and a distance from the first photodetection sensor 6 to the perpendicular bisector and a distance from the third photodetection sensor 42 to the perpendicular bisector is "b" respectively, a tilting angle θ can be expressed by the equation given below.

$$\theta = \tan^{-1}[(2b \cdot \Delta t1)/\{(\Delta t2 \cdot \sqrt{(A^2+b^2)} \cdot \cos(\tan^{-1}(b/A))\} - b/A]$$

In the equation as given above, "A" and "b" are already known. Further, by rotating a line laser projecting unit 29 (see FIG. 1) at a constant speed, that is, by rotating the line laser projecting unit 29 at a scanning angle speed as already known, it is possible to obtain the tilting angle θ without determining a distance to the photodetection device 2.

Further, by measuring Δt1 and Δt2, a scanning speed can be obtained and a measuring distance can be acquired from the scanning speed as obtained.

In the fourth embodiment, the tilting angle θ can be obtained without determining the measuring distance based on the scanning angle speed as known, a deviation of photodetection time between the first photodetection sensor 6 and the second photodetection sensor 7 and a deviation of photodetection time between the first photodetection sensor 6 and the third photodetection sensor 42. That is, the tilting angle θ can be obtained without determining the measuring distance and the scanning speed and the measuring distance can be obtained based on a rotation speed as known, a deviation of photodetection time of other photodetection unit using one of a photodetection unit as reference, and based on a deviation of photodetection time from the other photodetection unit. Therefore, a distance measuring mechanism is not needed for a surveying instrument 1 (see FIG. 1) itself, which contributes to a simplification of a structure of the instrument and the manufacturing cost can be reduced.

It is to be noted that in the fourth embodiment, three photodetection sensors 6, 7 and 42 are provided on the photodetection device 2, while four or more photodetection sensors may be used. Further, it is needless to say that the fourth embodiment may be combined with other embodiments.

Next, referring to FIG. 8A to FIG. 8C, description will be given on a fifth embodiment of the present invention.

Figures 8A, 8B, 8C:
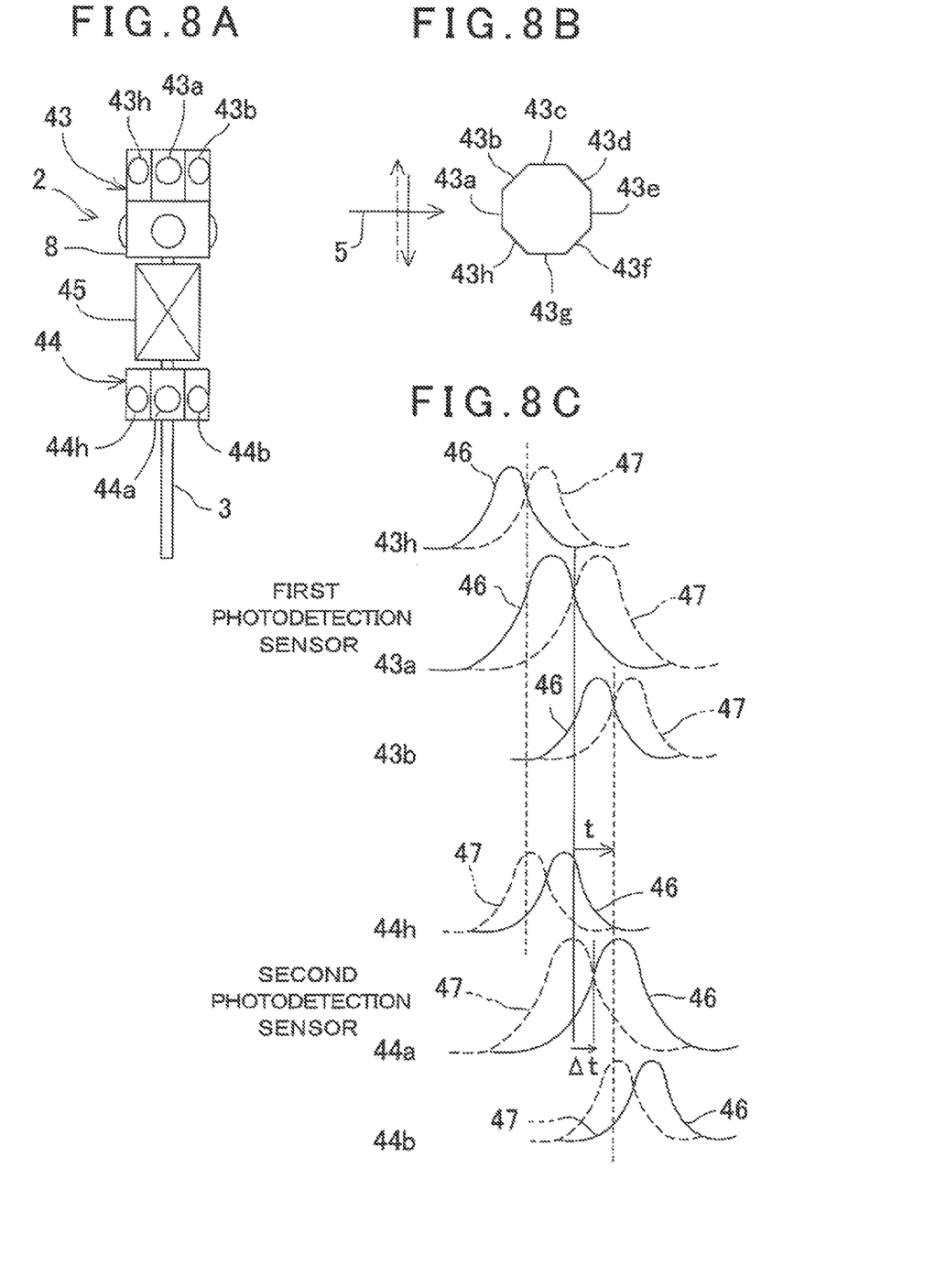
FIG. 8A is a side view to show a photodetection device according to a fifth embodiment of the present invention.
FIG. 8B is a plan view of the photodetection device.
FIG. 8C is a drawing to show a photodetection signal waveform of a line laser received by each photodetection sensors.

In the fifth embodiment, as a first photodetection unit, as shown in FIG. 8A and FIG. 8B, a first photodetection sensor 43 is used, which is an 8-surface sensor having photodetection sensors 43a to 43h provided at equal intervals on a circumference with an axis of a pole 3 as a center. Further, as a second photodetection unit, a second photodetection sensor 44 is used, which is an 8-surface sensor having photodetection sensors 44a to 44h provided at equal intervals on a circumference with an axis of the pole 3 as the center. Further, an omnidirectional prism 45 is used as a target and profile sensors provided in four directions are used as a directional sensor 8.

The photodetection sensor 43a and the photodetection sensor 44a, the photodetection sensor 43b and the photodetection sensor 44b, the photodetection sensor 43c and the photodetection sensor 44c, the photodetection sensor 43d and the photodetection sensor 44d, the photodetection sensor 43e and the photodetection sensor 44e, the photodetection sensor 43f and the photodetection sensor 44f, the photodetection sensor 43g and the photodetection sensor 44g, the photodetection sensor 43h and the photodetection sensor 44h are set in an arrangement so as to correspond with each other respectively, and are provided along a line running in parallel to the axis of the pole 3 and at an equal distance. For instance, in a case where the photodetection device 2 is installed vertically, it is so arranged that the photodetection sensor 43a and the photodetection sensor 44a receive the line laser 5 at the same time. A structure of the second photodetection sensor 44 is equivalent to a structure of the first photodetection sensor 43, so a detail is not shown in the figure.

For instance, as shown in FIG. 8B, in a case where the line laser 5 is projected to the photodetection sensor 43a under a condition that the photodetection device 2 is tilted, similarly to the first embodiment, the tilting angle θ of the photodetection device 2 can be detected based on a deviation time Δt of photodetection time between the photodetection sensor 43a and the photodetection time of the photodetection sensor 44a.

Further, because the first photodetection sensor 43 and the second photodetection sensor 44 are arranged as 8-surface sensors, in an arrangement as shown in FIG. 8B, the line laser 5 can be received with respect to three sets of photodetection sensors, the photodetection sensor 43h and the photodetection sensor 44h, the photodetection sensor 43a and the photodetection sensor 44a and the photodetection sensor 43b and the photodetection sensor 44b, in a single scanning. Therefore, the tilting angle θ can be detected per each set of the photodetection signal waveform 46 per each set, and it is possible to perform averaging processing so that the detection accuracy of the tilting angle θ can be improved.

Further, by reciprocating the line laser projecting unit 29 (see FIG. 1), a difference of response time between the photodetection sensors 43h, 43a and 43b and the photodetection sensors 44h, 44a and 44b can be cancelled based on the photodetection signal waveform 46 on an outward course and a photodetection signal waveform 47 on a return course, and it is possible to further improve the detection accuracy of the tilting angle θ.

Further, since the first photodetection sensor 43 and the second photodetection sensor 44 are 8-surface sensors and a target is the omnidirectional prism 45, the photodetection device 2 can be tracked from any direction and the first photodetection sensor 43 and the second photodetection sensor 44 can be scanned. Further, since the directional sensor 8 is arranged as a profile sensor provided in four directions, an inclining angle in an approaching and separating direction can be detected from any direction. Therefore, there is no need to direct each of the photodetection units to the surveying instrument 1, and this contributes to an improvement of a working efficiency.

It is to be noted that in the fifth embodiment, the first photodetection sensor 43 and the second photodetection sensor 44 are arranged as an 8-surface sensor having eight photodetection sensors, while it is needless to say that it may be designed as a multi-surface sensor having 7 or less or 9 or more photodetection sensors.

Figure 9:
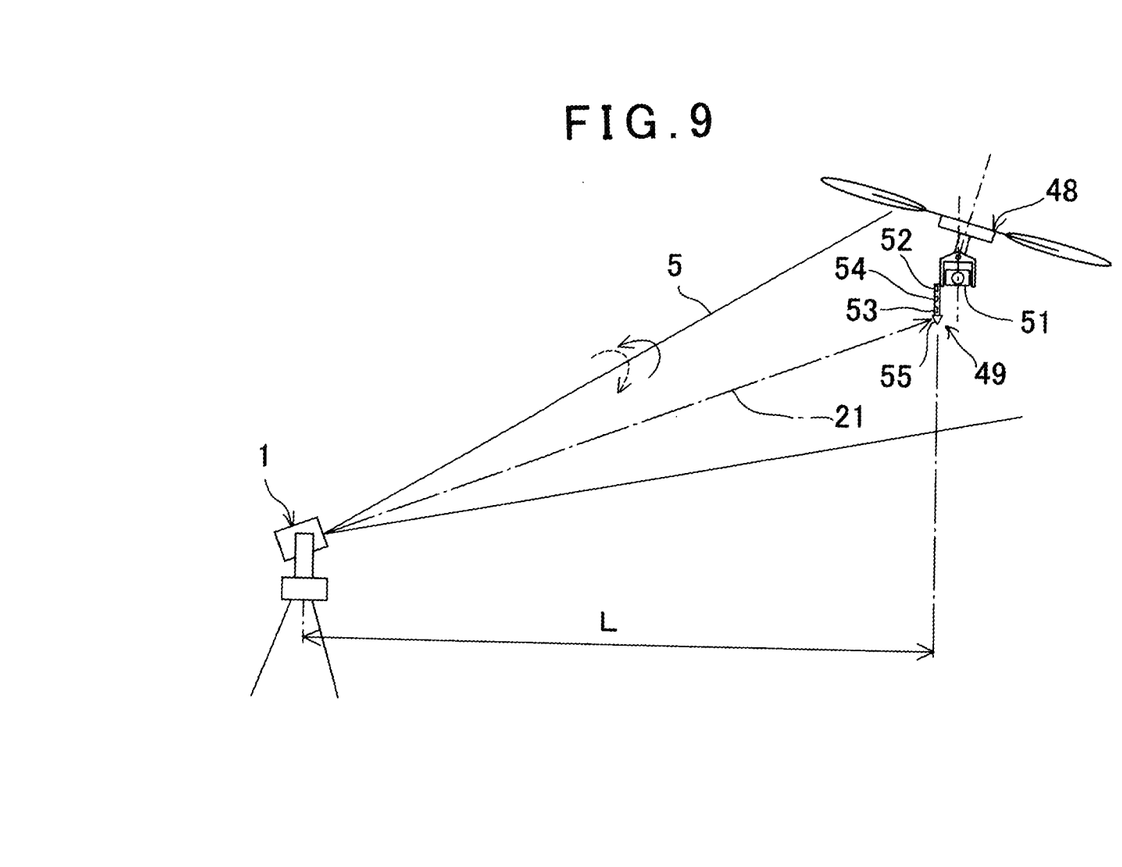
FIG. 9 is a side view to show a tilt detecting system according to a sixth embodiment of the present invention.

Next, referring to FIG. 9, a description will be given on a sixth embodiment of the present invention. In the sixth embodiment, a photodetection device 49 is mounted on a UAV (Unmanned Air Vehicle).

The UAV 48 has a camera 51 for carrying out photogrammetry, the camera 51 is installed on the UAV 48 via a gimbal, and the camera 51 is constantly maintained in a vertical posture. In a downward direction of the camera 51, the photodetection device 49 in a cylindrical shape is hanged. The photodetection device 49 is integrated with the camera 51, and an axis of the photodetection device 49 is vertical when the camera 51 is in the vertical posture. It is so arranged that in a case where the camera 51 is tilted, the photodetection device 49 is tilted in a same tilting direction and tilting angle.

Further, the photodetection device 49 has a first photodetection sensor 52 and a second photodetection sensor 53, and a distance between the first photodetection sensor 52 and the second photodetection sensor 53 is already known. Further, the photodetection device 49 has a camera 54 for detecting a direction of the UAV 48. By picking up an image of the surrounding by the camera 54, a direction of the UAV 48 can be detected by taking a predetermined object in the surrounding as reference. For instance, by acquiring an image of the surveying instrument 1 by the camera 54, a situation and the direction of the UAV 48 can be detected by using the surveying instrument 1 as reference. Further, an omnidirectional prism 55 having retro-reflectivity is mounted at a lower end of the photodetection device 49.

Further, the photodetection device 49 has an arithmetic unit and a communication unit, which are not shown, so as to calculate a tilting of the photodetection device 49 or a direction of the UAV 48 and to transmit the calculation results to the surveying instrument 1.

The surveying instrument 1 emits a tracking light to the omnidirectional prism 55 and receives a reflection light from the omnidirectional prism 55. Thereby, the surveying instrument 1 tracks the UAV 48 and can measure a position of the UAV 48 by emitting a distance measuring light. By measuring the position of the UAV 48, photogrammetry based on the image as picked up by the camera 51 can be performed on a coordinate system of the surveying instrument 1.

Here, the surveying instrument 1 emits a line laser 5 and the first photodetection sensor 52 and the second photodetection sensor 53 is made to receive the line laser 5, and by detecting a deviation of photodetection time between the first photodetection sensor 52 and the second photodetection sensor 53, a tilting angle of the UAV 48 and further a tilting angle of the camera 51 can be detected. Therefore, the position of the UAV 48 can be corrected by the tilting angle as detected, and further, a surveying result of photogrammetry can be corrected by the tilting angle of the camera 51, and the accuracy of photogrammetry can be improved by the UAV 48.

The invention claimed is:

1. A tilt detecting system comprising, a surveying instrument having a distance measuring function and a line laser projecting unit installed as horizontally rotatable for projecting a vertical line laser, and a photodetection device having at least two photodetection units provided at a known interval, a target with a retro-reflectivity and an arithmetic unit, wherein said line laser projecting unit is rotated, each of said photodetection units are made to scan said line laser and said arithmetic unit detects a tilting angle of said photodetection device based on a deviation between a photodetection time moment of each photodetection unit and the distance measurement result of said target of said surveying instrument.

2. A tilt detecting system according to claim 1, wherein said line laser projecting unit is moved reciprocally and said line laser is received at least twice by each photodetection unit.

3. A tilt detecting system according to claim 1 further comprising a diffraction grating provided on said line laser projecting unit, wherein said line laser is divided at a predetermined angular interval.

4. A tilt detecting system according to claim 1, wherein said photodetection unit is a polyhedron sensor having photodetection sensors installed at a predetermined angular pitch in a circumferential direction and said target is an omnidirectional prism.

5. A tilt detecting system according to claim 1, wherein said surveying instrument further has a tracking function, said surveying instrument projects a tracking light and tracks said photodetection device based on the tracking light reflected by said target.

6. A tilt detecting system according to claim 5, wherein said photodetection device further comprises a pole for supporting said photodetection device and a two-dimensional directional sensor for receiving the tracking light of said surveying instrument and detects an inclining angle in an approaching and separating direction with respect to said surveying instrument and a rotation angle around a centerline of said pole as a center.

7. A tilt detecting system according to claim 5, wherein said photodetection device is provided on a flying object, said surveying instrument has a tracking function, said surveying instrument measures a position of said flying object, and corrects the position of said flying object based on a tilting angle of said photodetection device.

8. A tilt detecting system according to claim 1, wherein said photodetection device has at least three photodetection units and wherein said line laser projecting unit is rotated at a known speed and said line laser is scanned by each photodetection unit, and said arithmetic unit detects a tilting angle of said photodetection device based on a deviation of photodetection time between another photodetection unit and one of the photodetection units as reference and a deviation of photodetection time between the other photodetection unit and said one as reference.

9. A tilt detecting system according to claim 8, wherein said line laser projecting unit is moved reciprocally and said line laser is received at least twice by each photodetection unit.

10. A tilt detecting system according to claim 8 further comprising a diffraction grating provided on said line laser projecting unit, wherein said line laser is divided at a predetermined angular interval.

11. A tilt detecting method comprising, a step of projecting a vertical line laser from a line laser projecting unit installed on a surveying instrument, a step of horizontally rotating said line laser projecting unit around an optical axis of a tracking light as a center and scanning said line laser so as to pass at least two photodetection units installed at a known interval on a photodetection device, a step of measuring a distance to a target of said photodetection device by said surveying instrument, and a step of detecting a tilting angle of said photodetection device based on a deviation of photodetection time when each photodetection unit of said photodetection device is made to receive said line laser.

12. A tilt detecting method according to claim 11 comprising, a step of scanning said line laser so as to pass at least three photodetection units installed at a known interval on said photodetection device at a constant speed, and a step of detecting a tilting angle of said photodetection device based on a deviation of photodetection time between another photodetection unit and one of the photodetection units as reference and a deviation of photodetection time between the other photodetection unit and said one as reference when each photodetection unit is made to receive said line laser.

13. A tilt detecting system according to claim 2 further comprising a diffraction grating provided on said line laser projecting unit, wherein said line laser is divided at a predetermined angular interval.

14. A tilt detecting system according to claim 2, wherein said photodetection unit is a polyhedron sensor having photodetection sensors installed at a predetermined angular pitch in a circumferential direction and said target is an omnidirectional prism.

15. A tilt detecting system according to claim 9 further comprising a diffraction grating provided on said line laser projecting unit, wherein said line laser is divided at a predetermined angular interval.

\* \* \* \* \*